United States Patent
Johnson et al.

(10) Patent No.: US 9,683,548 B2
(45) Date of Patent: Jun. 20, 2017

(54) TOOL AND METHOD FOR SCARFING A ROTOR BLADE SEGMENT

(71) Applicant: General Electric Company, Schenectady, NY (US)

(72) Inventors: Stephen Bertram Johnson, Greenville, SC (US); Steven Haines Olson, Greer, SC (US); Edward McBeth Stewart, Greenville, SC (US)

(73) Assignee: General Electric Company, Schenectady, NY (US)

( * ) Notice: Subject to any disclaimer, the term of this patent is extended or adjusted under 35 U.S.C. 154(b) by 419 days.

(21) Appl. No.: 13/802,954

(22) Filed: Mar. 14, 2013

(65) Prior Publication Data
US 2014/0260849 A1 Sep. 18, 2014

(51) Int. Cl.
*B23Q 9/00* (2006.01)
*F03D 1/06* (2006.01)
(Continued)

(52) U.S. Cl.
CPC ............ *F03D 1/0675* (2013.01); *F03D 1/065* (2013.01); *F03D 3/0436* (2013.01); *F03D 13/10* (2016.05); *B23Q 9/005* (2013.01); *B23Q 9/0007* (2013.01); *B23Q 9/0014* (2013.01); *B23Q 9/0042* (2013.01); *F05B 2230/23* (2013.01);
(Continued)

(58) Field of Classification Search
CPC .... B23Q 9/007; B23Q 9/0014; B23Q 9/0042; B23Q 9/005; B23Q 2210/006; B23C 1/20; B23C 3/18; B23C 3/16; Y10T 409/306384; Y10T 409/30644; Y10T 83/68; Y10T 83/667

USPC .......... 409/178, 179, 296; 30/289, 393, 294, 30/372, 376
See application file for complete search history.

(56) References Cited

U.S. PATENT DOCUMENTS 1,887,424 A * 11/1932 Perazzoli ................ E01B 31/13
  104/307
2,921,492 A * 1/1960 Worth ......................... 83/471.2
(Continued)

FOREIGN PATENT DOCUMENTS

DE    102007026100   * 12/2008 ........... B23Q 9/0042
WO   WO 2010/003847 A2 *  1/2010 ........... B23Q 9/0042

OTHER PUBLICATIONS

Translation WO2010003847 available at http://translationportal.epo.org/emtp/translate?Action=description-retrieval&COUNTRY=WO&ENGINE=google&FORMAT=docdb&KIND=A2&LOCALE=en_EP&NUMBER=2010003847&OPS=ops.epo.org%2F3.1&SRCLANG=fr&TRGLANG=en&apikey=TSMqTfrVAvNtryGI8QIfbozj8DnAGIqJ&PDF=true (last visited Mar. 10, 2015).*

*Primary Examiner* — Sunil K Singh
*Assistant Examiner* — Ryan Rufo
(74) *Attorney, Agent, or Firm* — Dority & Manning, P.A.

(57) ABSTRACT

Tools and methods are provided for scarfing rotor blade segments. A rotor blade segment includes a pressure side and a suction side. A tool includes a first guide configured for mounting on one of the pressure side or the suction side, the first guide including a first curved rail and a second curved rail spaced from the first curved rail. The tool further includes a second guide movably coupled to the first guide at a scarf angle, the second guide including a guide rail extending between and movable along the first curved rail and the second curved rail. The tool further includes a cutting device movably coupled to the second guide, the (Continued)

cutting device movable along the guide rail and operable to remove material from the one of the pressure side or the suction side.

10 Claims, 9 Drawing Sheets

(51) Int. Cl.
*F03D 3/04* (2006.01)
*F03D 13/10* (2016.01)

(52) U.S. Cl.
CPC ..... *F05B 2230/50* (2013.01); *F05B 2240/302* (2013.01); *Y02E 10/721* (2013.01); *Y02E 10/74* (2013.01); *Y02P 70/523* (2015.11); *Y10T 83/0524* (2015.04); *Y10T 83/667* (2015.04); *Y10T 409/30644* (2015.01)

(56) References Cited

U.S. PATENT DOCUMENTS

| | | | | |
|---|---|---|---|---|
| 3,259,021 | A * | 7/1966 | Appleton et al. | 409/124 |
| 3,450,001 | A * | 6/1969 | Fortune | 409/130 |
| 3,456,555 | A * | 7/1969 | Dunlap | 409/179 |
| 3,476,013 | A * | 11/1969 | Zemberry | B23Q 16/005 340/680 |
| 4,102,245 | A * | 7/1978 | Cousins | 409/194 |
| 4,434,824 | A * | 3/1984 | Bussey | 144/144.1 |
| 4,489,634 | A * | 12/1984 | Volk | 83/522.28 |
| 4,614,466 | A * | 9/1986 | Snyder | 409/179 |
| 4,615,654 | A * | 10/1986 | Shaw | 409/178 |
| 4,770,216 | A * | 9/1988 | Ruscak | 144/144.1 |
| 5,333,385 | A * | 8/1994 | Chou | B23Q 9/0035 30/310 |
| 5,468,099 | A * | 11/1995 | Wheetley et al. | 408/1 R |
| 6,158,666 | A * | 12/2000 | Banks et al. | 238/10 R |
| 6,467,385 | B1 * | 10/2002 | Buttrick et al. | 83/745 |
| 6,843,328 | B2 * | 1/2005 | Boyl-Davis et al. | 173/32 |
| 7,216,408 | B2 * | 5/2007 | Boyl-Davis et al. | 29/33 R |
| 7,740,453 | B2 | 6/2010 | Zirin et al. | |
| 2002/0168241 | A1 * | 11/2002 | David et al. | 409/178 |
| 2004/0265077 | A1 * | 12/2004 | Boyl-Davis et al. | 408/1 R |
| 2006/0060030 | A1 * | 3/2006 | Lowder | B23D 61/026 76/48 |
| 2008/0181733 | A1 * | 7/2008 | Wright et al. | 408/1 R |
| 2009/0095141 | A1 * | 4/2009 | Billings | B27B 27/06 83/468.3 |
| 2009/0143207 | A1 * | 6/2009 | Wampler et al. | 483/51 |
| 2010/0122444 | A1 * | 5/2010 | Reid et al. | 29/243.54 |
| 2011/0243676 | A1 * | 10/2011 | Marguet | B21J 15/14 408/72 R |
| 2012/0014759 | A1 * | 1/2012 | Sarh et al. | 408/76 |
| 2014/0237793 | A1 * | 8/2014 | Gamboa | 29/426.2 |

* cited by examiner

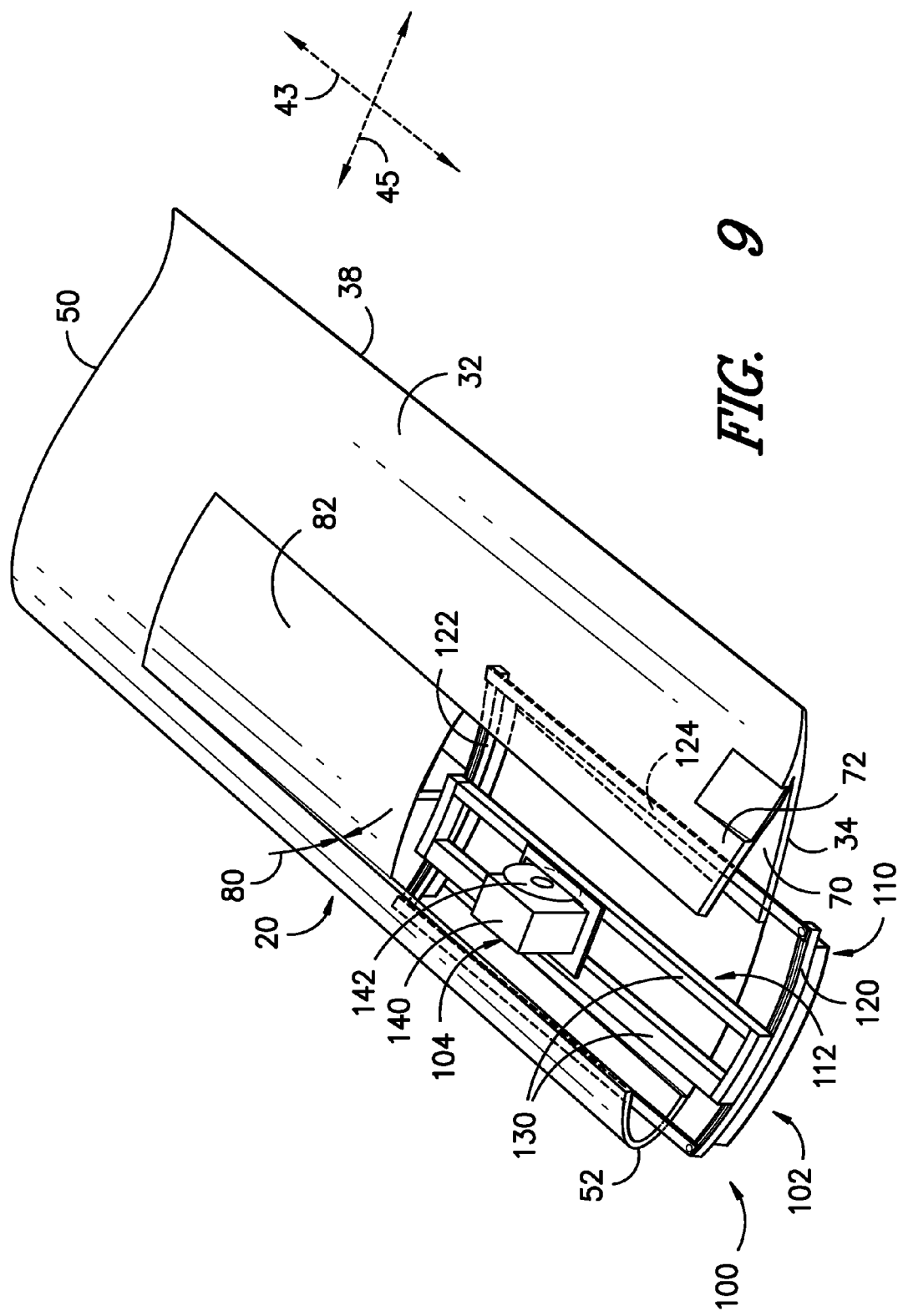

TOOL AND METHOD FOR SCARFING A ROTOR BLADE SEGMENT

FIELD OF THE INVENTION

The present disclosure relates generally to rotor blades for wind turbines, and more particularly to tools and methods for scarfing rotor blade segments.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The size, shape, and weight of rotor blades are factors that contribute to energy efficiencies of wind turbines. An increase in rotor blade size increases the energy production of a wind turbine, while a decrease in weight also furthers the efficiency of a wind turbine. Furthermore, as rotor blade sizes grow, extra attention needs to be given to the structural integrity of the rotor blades. Presently, large commercial wind turbines in existence and in development are capable of generating from about 1.5 to about 12.5 megawatts of power. These larger wind turbines may have rotor blade assemblies larger than 90 meters in diameter. Additionally, advances in rotor blade shape encourage the manufacture of a forward swept-shaped rotor blade having a general arcuate contour from the root to the tip of the blade, providing improved aerodynamics. Accordingly, efforts to increase rotor blade size, decrease rotor blade weight, and increase rotor blade strength, while also improving rotor blade aerodynamics, aid in the continuing growth of wind turbine technology and the adoption of wind energy as an alternative energy source.

As the size of wind turbines increases, particularly the size of the rotor blades, so do the respective costs of manufacturing, transporting, and assembly of the wind turbines. The economic benefits of increased wind turbine sizes must be weighed against these factors. For example, the costs of pre-forming, transporting, and erecting a wind turbine having rotor blades in the range of 90 meters may significantly impact the economic advantage of a larger wind turbine.

One known strategy for reducing the costs of pre-forming, transporting, and erecting wind turbines having rotor blades of increasing sizes is to manufacture the rotor blades in blade segments. The blade segments may be assembled to form the rotor blade after, for example, the individual blade segments are transported to an erection location. Further, in many cases where increased rotor blade sizes are desired, it may be desirable to increase the lengths of existing rotor blades. For example, an existing rotor blade may be divided into segments, and an insert may be provided between neighboring segments to increase the length of the segments.

In particular, one known method for joining rotor blade segments is through scarfing of neighboring blade segments to create tapered or angled joint faces on the blade segments. An insert may then be provided between the blade segments having mating joint faces. The joint faces may be joined together to create scarf joints, connecting the neighboring blade segments and insert. However, known methods and apparatus for scarfing rotor blade segments may have a variety of disadvantages. For example, a key factor in creating a strong scarf joint is the geometry of the mating joint faces. Scarf joints created in rotor blade segments must thus account for both the desired scarf angle and the curvature of the rotor blade segment. One current approach to scarfing a rotor blade segment is to manually grind a surface of the rotor blade to the desired angle. However, such manual approaches are inaccurate, leading to relatively weaker scarf joints, and are further time-consuming and thus costly. Other current approaches to scarfing rotor blade segments require the use of CNC machines. However, such approaches require prohibitively high capital costs, and are complex to program to adapt to the requirements of individual rotor blade segments.

Accordingly, improved methods and apparatus for scarfing rotor blade segments are desired in the art. In particular, methods and apparatus that accurately account for desired scarf angles and rotor blade segment curvatures would be advantageous. Further, methods and apparatus that provide such accuracy efficiently and at relatively low costs would be desired.

BRIEF DESCRIPTION OF THE INVENTION

Aspects and advantages of the invention will be set forth in part in the following description, or may be obvious from the description, or may be learned through practice of the invention.

In one embodiment, a tool is provided for scarfing a rotor blade segment. The rotor blade segment includes a pressure side, a suction side, a leading edge, and a trailing edge each extending between a first end and a second end. The tool includes a first guide configured for mounting on one of the pressure side or the suction side, the first guide including a first curved rail and a second curved rail spaced from the first curved rail. The first curved rail and the second curved rail each have a curvature that generally corresponds to a curvature of the one of the pressure side or the suction side. The tool further includes a second guide movably coupled to the first guide at a scarf angle, the second guide including a guide rail extending between and movable along the first curved rail and the second curved rail. The tool further includes a cutting device movably coupled to the second guide, the cutting device movable along the guide rail and operable to remove material from the one of the pressure side or the suction side.

In another embodiment, a method for scarfing a rotor blade segment is provided. The method includes moving a cutting device on a frame along a chord-wise axis of a rotor blade segment. The rotor blade segment includes a pressure side, a suction side, a leading edge, and a trailing edge each extending between a first end and a second end. Movement along the chord-wise axis occurs generally along a curvature of the one of the pressure side or the suction side. The method further includes moving the cutting device on the frame along a span-wise axis of the rotor blade segment at a scarf angle, and operating the cutting device during movement along the span-wise axis to remove material from the one of the pressure side or the suction side.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 9 is a perspective view of a tool mounted to an inner surface of a suction side of a rotor blade segment according to one embodiment of the present disclosure.

DETAILED DESCRIPTION OF THE INVENTION

Figure 1:
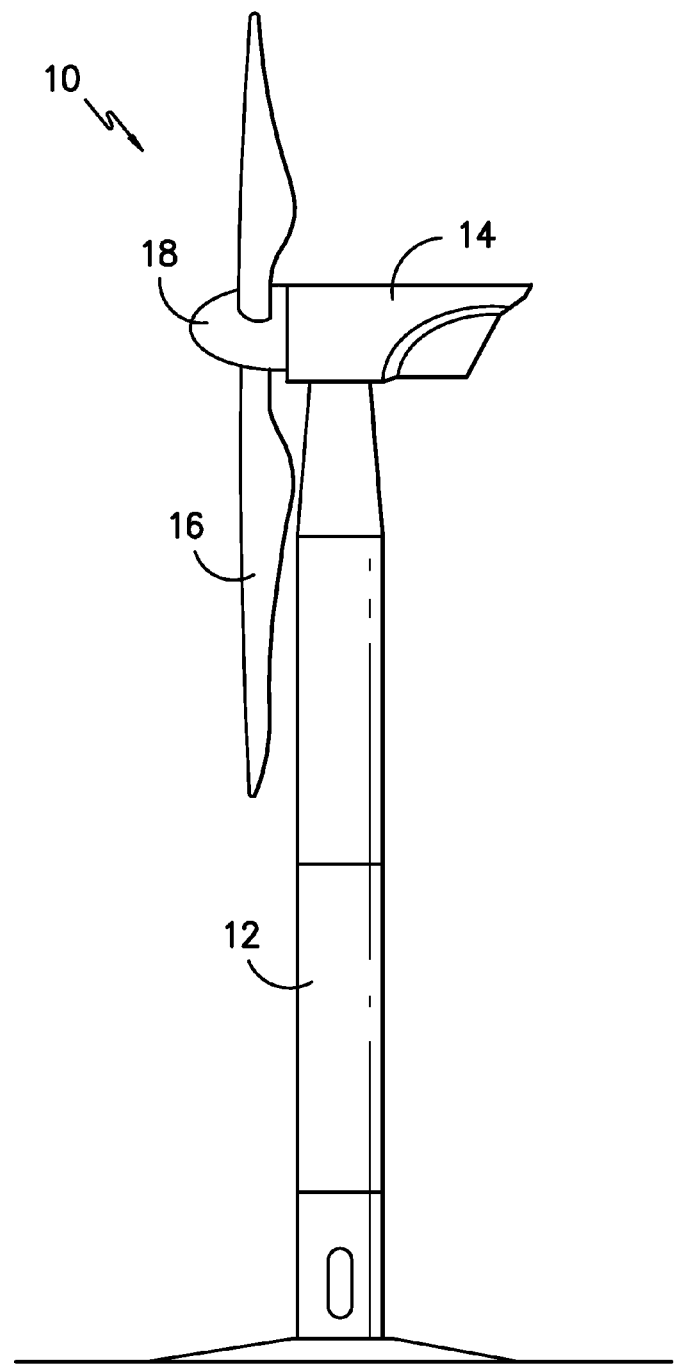
FIG. 1 is a perspective view of a known wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft, as discussed below. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
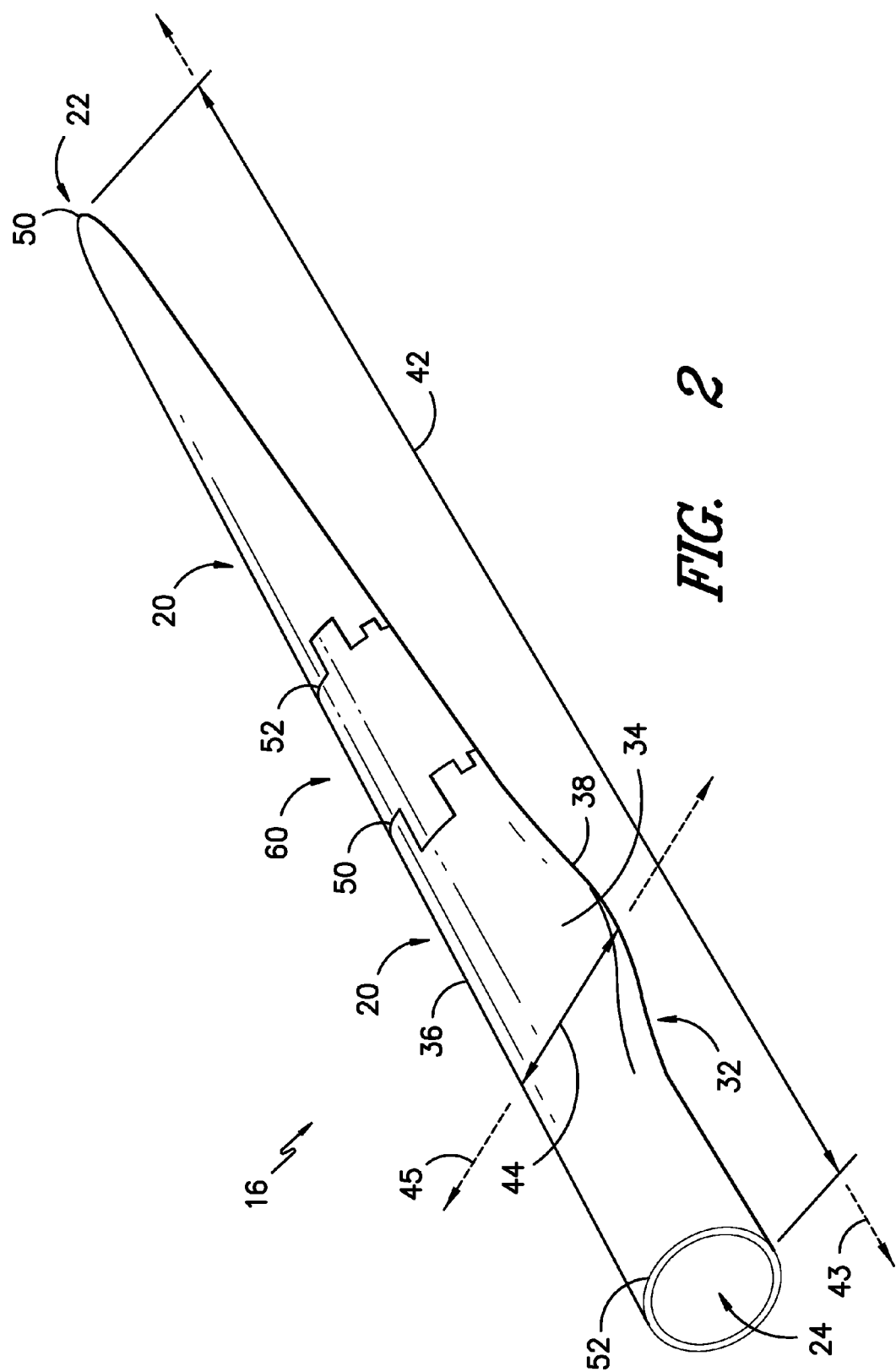
FIG. 2 is a perspective view of a wind turbine rotor blade according to one embodiment of the present disclosure.

Referring to FIG. 2, one embodiment of a rotor blade 16 in accordance with the present disclosure is shown. The rotor blade 16 may include a plurality of individual blade segments 20 aligned in an end-to-end order from a blade tip 22 to a blade root 24. Each of the individual blade segments 20 may be uniquely configured so that the plurality of blade segments 20 define a complete rotor blade 16 having a designed aerodynamic profile, length, and other desired characteristics. For example, each of the blade segments 20 may have an aerodynamic contour that corresponds to the aerodynamic contour of adjacent blade segments 20. Thus, the aerodynamic contours of the blade segments 20 may form a continuous aerodynamic contour of the rotor blade 16.

In general, the rotor blade 16, and thus each blade segment 20, may include a pressure side 32 and a suction side 34 extending between a leading edge 36 and a trailing edge 38. Additionally, the rotor blade 16 may have a span 42 extending along a span-wise axis 43 and a chord 44 extending along a chord-wise axis 45. The chord 44 may change throughout the span 42 of the rotor blade 16. Thus, a local chord may be defined at any span-wise location on the rotor blade 16 or any blade segment 20 thereof.

The rotor blade 16 may, in exemplary embodiments, be curved. Curving of the rotor blade 16 may entail bending the rotor blade 16 in a generally flapwise direction and/or in a generally edgewise direction. The flapwise direction is a direction substantially perpendicular to a transverse axis through a cross-section of the widest side of the rotor blade 16. Alternatively, the flapwise direction may be construed as the direction (or the opposite direction) in which the aerodynamic lift acts on the rotor blade 16. The edgewise direction is perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

As discussed, FIG. 2 illustrates a plurality of blade segments 20 forming a rotor blade 16. In the embodiment shown, one blade segment 20 extends from the root 14, while a neighboring blade segment 20 extends from the tip 22. It should be understood, however, that a rotor blade 16 according to the present disclosure may have any suitable number of blade segments 20, such as two, three, four or more. Each blade segment 20, and each of the pressure side 32, suction side 34, leading edge 36, and trailing edge 38 thereof, may extend between a first end 50 and a second end 52 as shown. The first end 50 and/or second end 52 may be the tip 22 and/or root 24, or any other suitable location on the rotor blade 16 between the tip 22 and root 24.

As further shown in FIG. 2, an insert 60 may be disposed between neighboring blade segments 20 in a rotor blade 16, and may join the blade segments 20 together. In exemplary embodiments, and as discussed in detail below, the insert 60 may be joined to each blade segment 20 through a scarf joint. Thus, a portion of a rotor blade segment 20 may be scarfed, or angled or taped, to form a joint face, and the insert 60 may have a mating joint face. The joint faces may be connected and fastened together to form the scarf joint.

Figure 3:
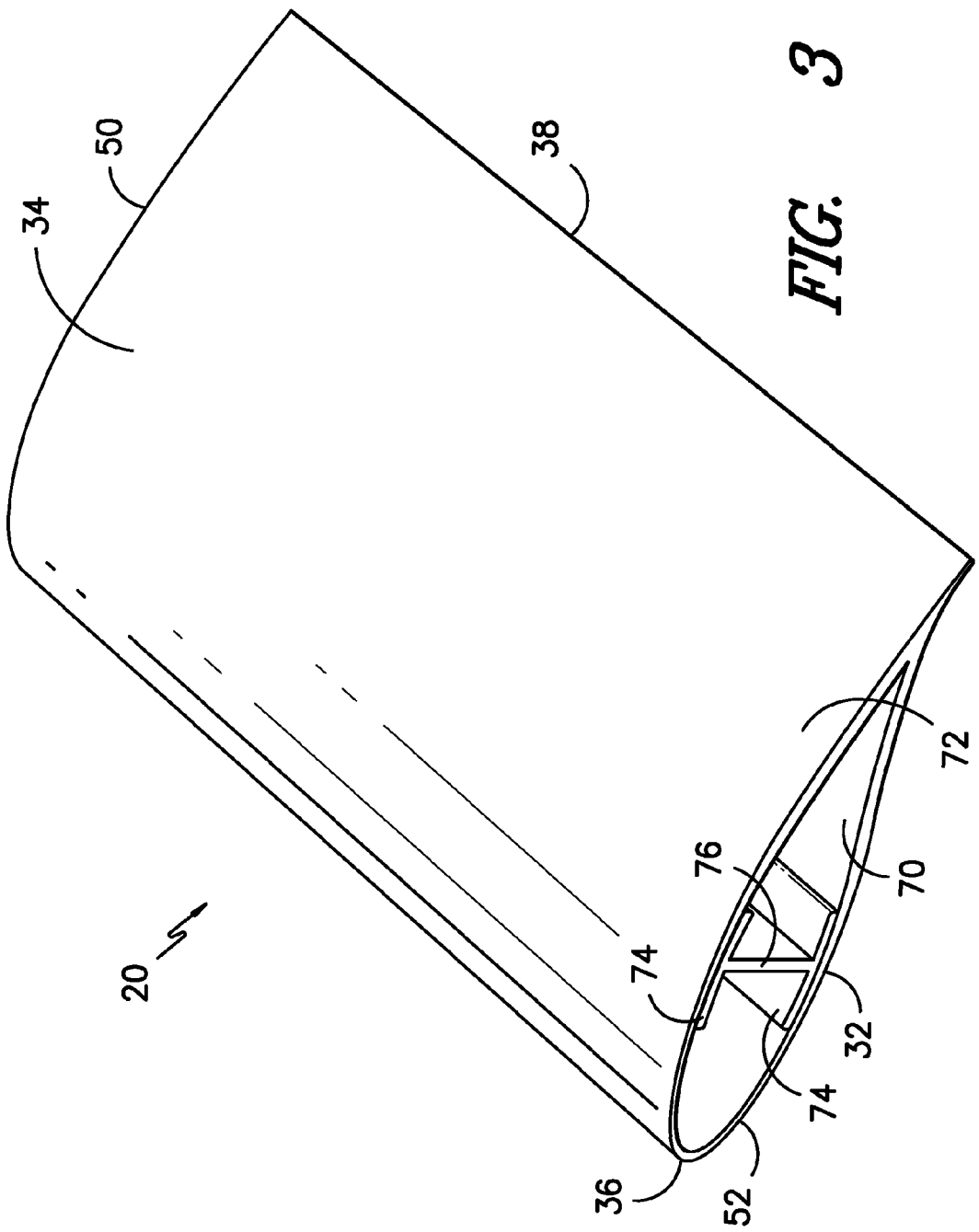
FIG. 3 is a perspective view of a portion of a rotor blade segment before scarfing according to one embodiment of the present disclosure.
Figure 5:
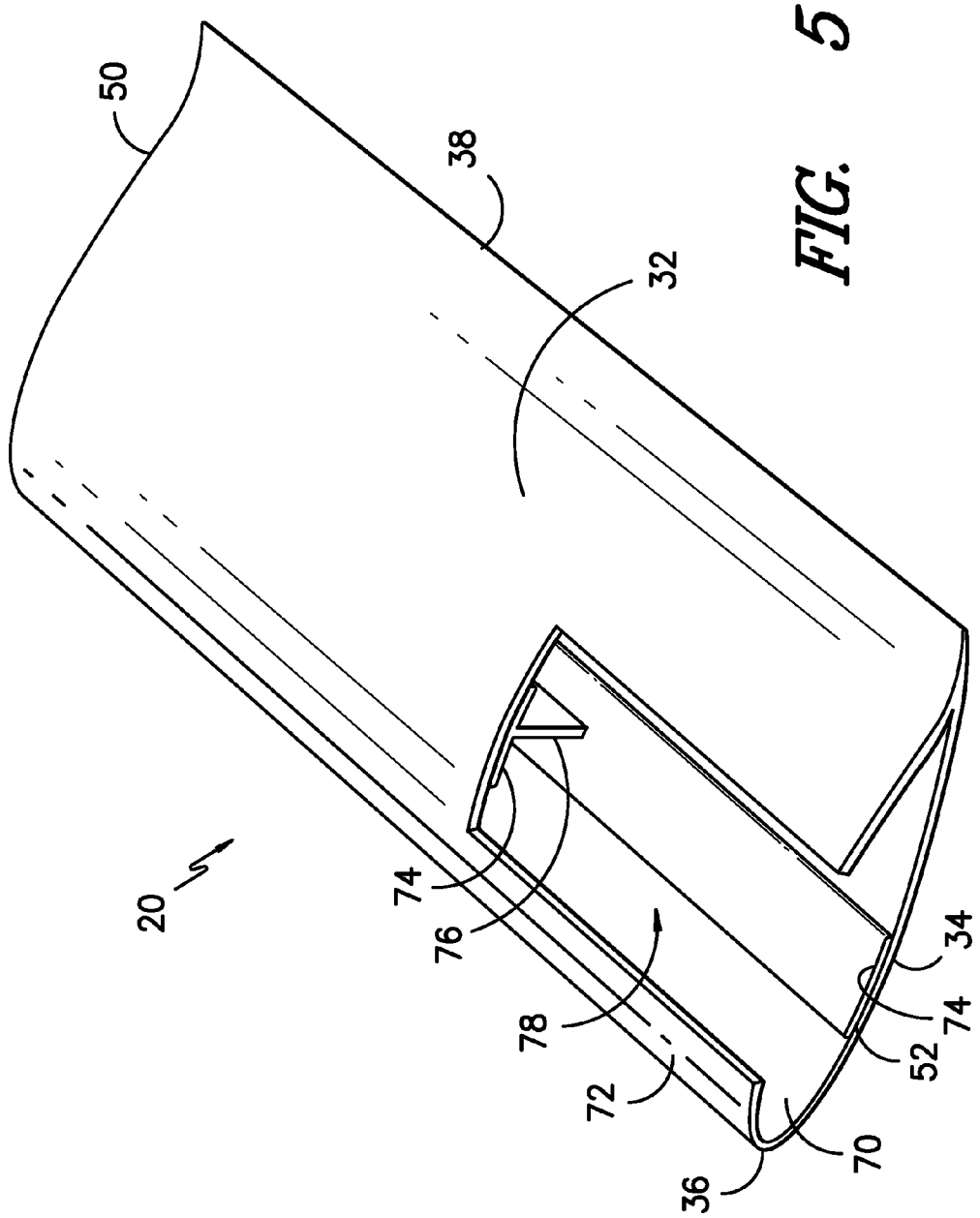
FIG. 5 is a perspective view of a portion of a rotor blade segment before scarfing according to another embodiment of the present disclosure.

FIGS. 3 and 5 illustrate various embodiments of a blade segment 20 before scarfing. As shown and as discussed above, the blade segment 20 includes a pressure side 32, a suction side 34, a leading edge 36, and a trailing edge 38 each extending between a first end 50 and a second end 52. Further, the rotor blade segment 20 includes an inner surface 70 and an outer surface 72. The pressure side 32, suction side 34, leading edge 36, and trailing edge 38 each include and define the inner surface 70 and outer surface 72. A blade segment 20 may further include one or more spar caps 74, such as a spar cap coupled to the pressure side 32 and a spar cap coupled to the suction side 34, as shown. A shear web 76 may extend between the spar caps 74.

In some embodiments, as shown in FIG. 5, a cutaway portion 78 of one of the pressure side 32 or the suction side 34, such as the pressure side 32 in the embodiment shown, is shown. In these embodiments, a portion of the one of the pressure side 32 or the suction side 34 is cut away from the blade segment 20 to provide access to an inner surface 70 of the other of the pressure side 32 or suction side 34, as discussed below, thus defining a cutaway portion 78.

Figure 4:
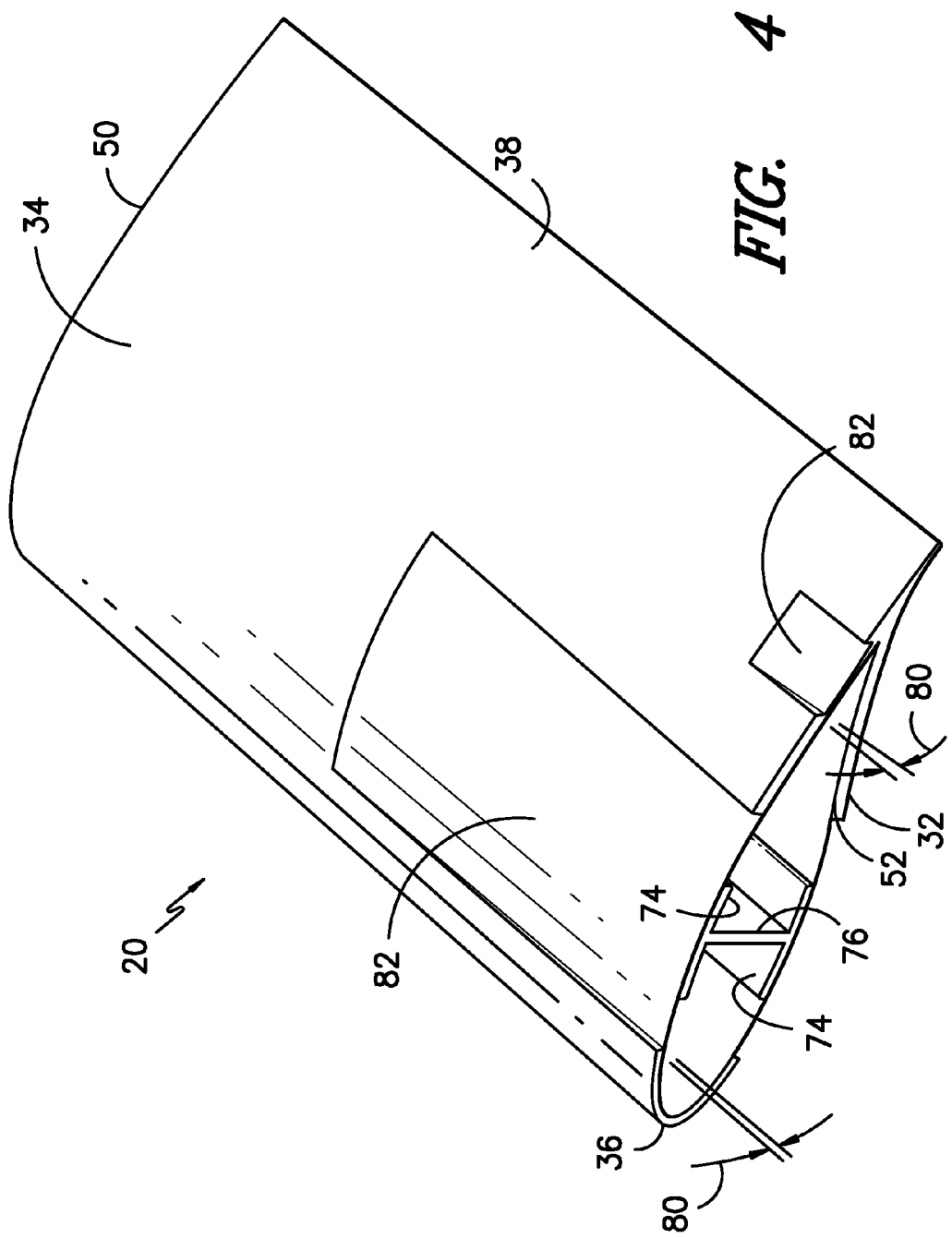
FIG. 4 is a perspective view of a portion of the rotor blade segment of FIG. 3 after scarfing according to one embodiment of the present disclosure.
Figure 6:
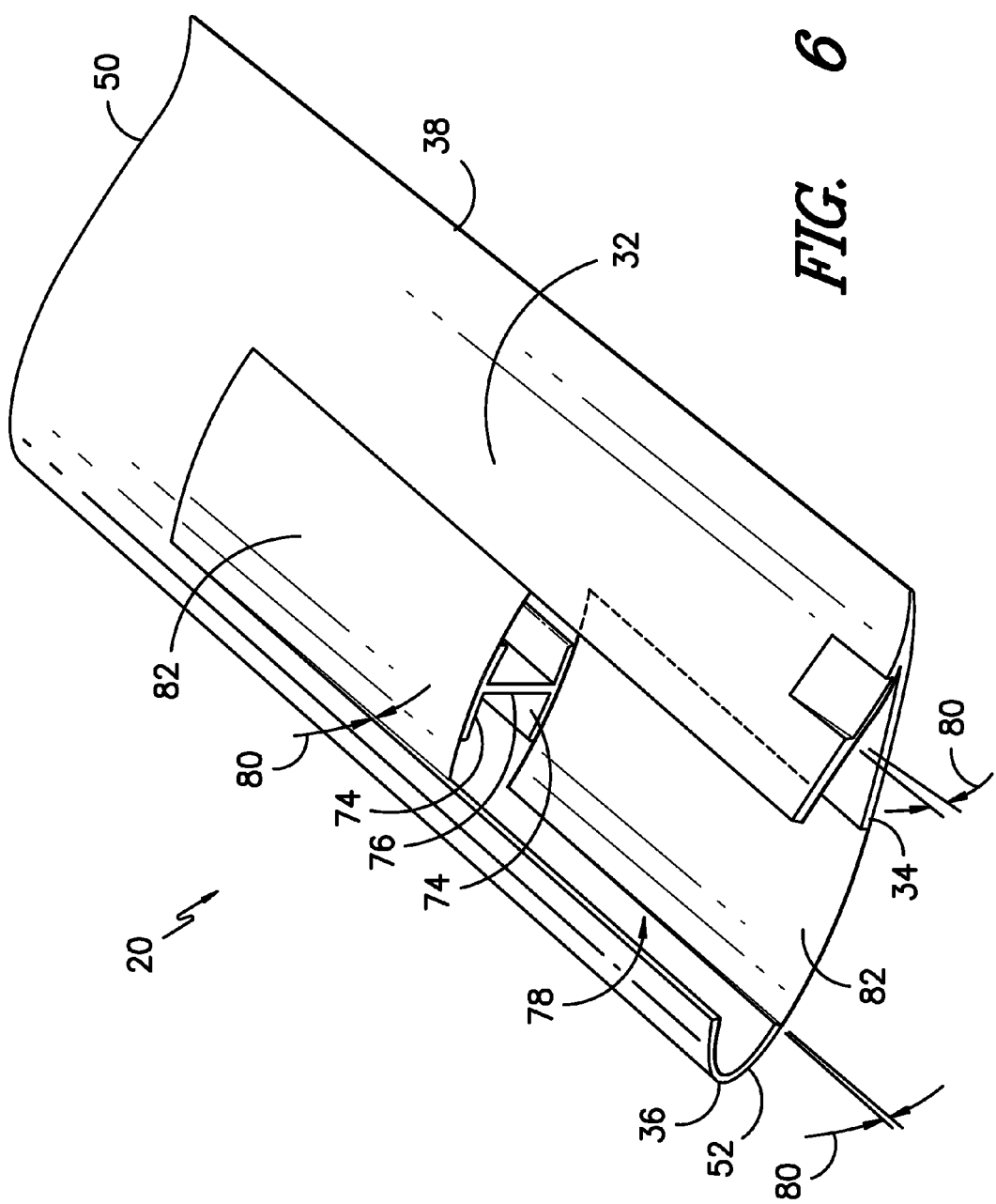
FIG. 6 is a perspective view of a portion of the rotor blade segment of FIG. 5 after scarfing according to another embodiment of the present disclosure.

FIGS. 4 and 6 illustrate various embodiments of a blade segment 20 after scarfing. As shown, a portion or portions of the pressure side 32 and suction side 34 are scarfed at a scarf angle 80 (see FIG. 8). The scarf angle 80 may be any suitable angle for creating a scarf joint, such as in some embodiments between approximately 1 degree and approximately 5 degrees, or in other embodiments between approximately 1 degree and approximately 3 degrees. Such scarfing 80 creates joint faces 82 that may be utilized to join the blade segment 20 to, for example, an insert 60 or other blade segment 20. In some embodiments, for example, scarfing 80 may remove material from a portion of the pressure side 32 or suction side 34 that is coupled to a spar cap 74. Thus, a resulting joint face 82 may be a portion of the pressure side 32 or suction side 34 that is coupled to the spar cap 74. In other embodiments, scarfing 80 may remove material from a portion of the pressure side 32 or suction side 34 that is located between the spar caps 74 and the trailing edge 38 along the chord-wise axis 45. This location may be a location of "biax" (bi-axial composite) material forming a portion of the pressure side 32 and/or suction side 34. Thus, a resulting joint face 82 may be a portion of the pressure side 32 or suction side 34 that is between the spar caps 74 and the trailing edge 38 and/or formed from a biax material.

Figure 7:
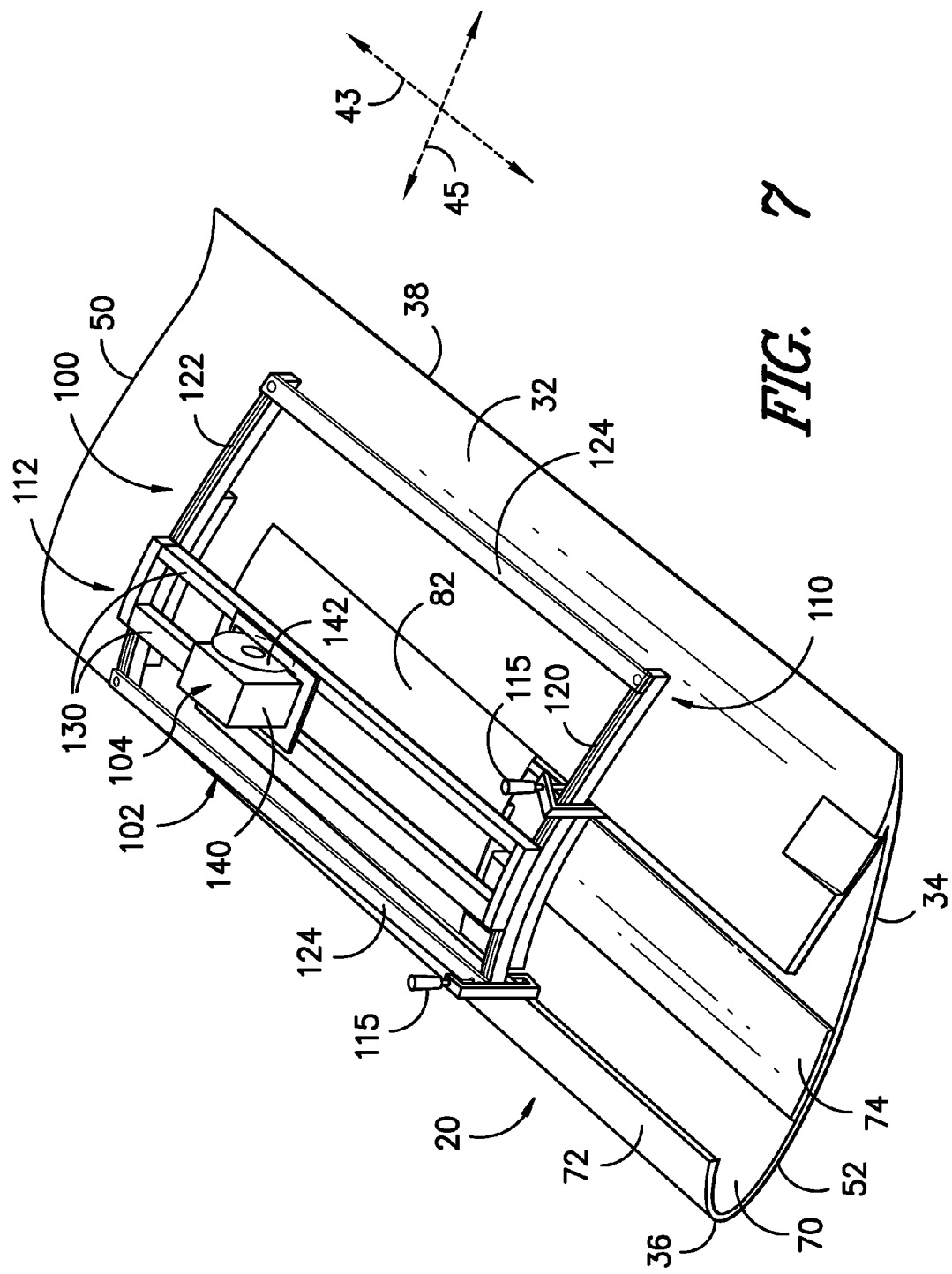
FIG. 7 is a perspective view of a tool mounted to an outer surface of a pressure side of a rotor blade segment according to one embodiment of the present disclosure.
Figure 8:
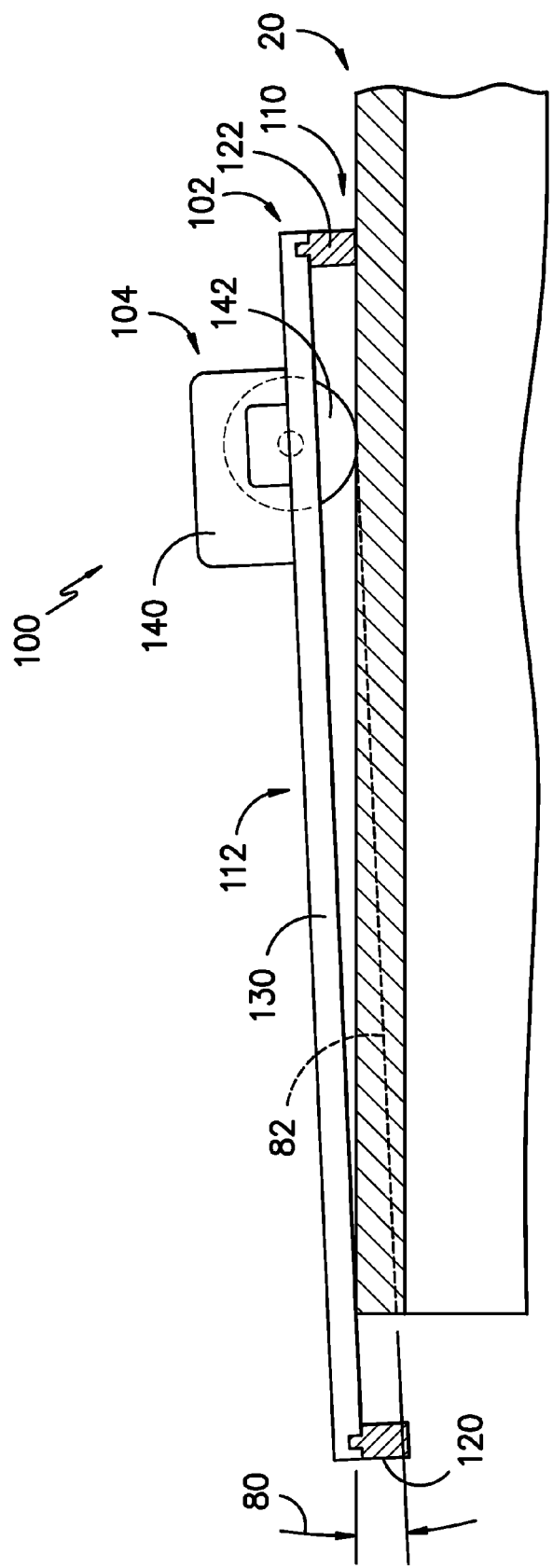
FIG. 8 is a side view of a tool mounted to an outer surface of a pressure side of a rotor blade segment according to one embodiment of the present disclosure.

FIGS. 7 through 9 illustrate various embodiments of a tool 100 utilized to accurately and efficiently scarf a rotor blade segment 20. Tools 100 according to the present disclosure accurately account for both the scarf angle 80 and the curvature of the rotor blade 16, such as of the inner and outer surface 70, 72 thereof. Further, use of such tools 100 is efficient and inexpensive.

As shown, a tool 100 according to the present disclosure includes a frame 102 and a cutting device 104. The frame 102 generally facilitates movement of the cutting device 104 in various directions with respect to a surface of the pressure side 32 or suction side 34. For example, as discussed below and as shown in FIGS. 7 through 9, the frame 102 may in exemplary embodiments facilitate movement of the cutting device along the chord-wise axis 45 and span-wise axis 43. Further, the frame 102 may account for both the desired scarf angle 80 and the curvature of the one of the pressure side 32 or suction side 34 on which the frame 102 is mounted, thus facilitating accurate scarfing by the cutting device 104. For example, movement of the cutting device 104 on the frame 102 may generally be along the curvature of the surface of the one of the pressure side 32 or suction side 34 and/or at the scarf angle 80, as discussed below.

In exemplary embodiments, as shown, the frame 102 comprises a first guide 110 and a second guide 112. The first guide 110, and thus the tool 100 in general, may be configured for mounting on one of the pressure side 32 or the suction side 34. For example, FIGS. 7 and 8 illustrate a first guide 110 mounted on the outer surface 72 of the pressure side 32 of a blade segment 20. FIG. 9 illustrates a first guide 110 mounted on the inner surface 74 of the suction side 34 of a blade segment 20. In other embodiments, a first guide 110 could be mounted on the inner surface 74 of the pressure side 32, or the outer surface 72 of the suction side 34.

In exemplary embodiments, the first guide 110 may be generally mounted to the rotor blade segment 20 such that it is stationary on the rotor blade segment 20. For example, the first guide 110 may be clamped or otherwise affixed to the rotor blade segment 20 during the scarfing process. Clamps 115, for example, may be utilized to mount the first guide 110 in a stationary position.

Further, in some embodiments, the first guide 110 may be mounted on the rotor blade segment 20 in a position such that operation of the cutting device 104 may remove material from the portion of the one of the pressure side 32 or suction side 34 that is coupled to a spar cap 74. Thus, in these embodiments, the area defined by the first guide 110, when mounted on the rotor blade 20, may encompass at least a portion of the rotor blade segment 20 that is coupled to the spar cap 74. Operation of the cutting device 104 may be within the area defined by the first guide 110, and specifically the curved rails as discussed below. In other embodiments, the first guide 110 may be mounted on the rotor blade segment 20 in a position such that operation of the cutting device 104 may remove material from another portion of the one of the pressure side 32 or suction side 34, such as a portion formed from biax and/or between the spar caps 74 and trailing edge 38, or another suitable portion.

The first guide 110 may include a first curved rail 120 and a second curved rail 122. The second curved rail 122 may be spaced apart from the first curved rail 120. Both rails 120, 122 may have a curvature that generally corresponds to a curvature of the one of the pressure side 32 or suction side 34 to which the tool 100 is mounted, such as of the outer or inner surface 72, 70 thereof. For example, as shown, a bottom surface of the first rail 120 may contact and generally be flush with the outer or inner surface 72, 70 on which it is mounted, and a top surface of the rail 120 may have a corresponding curvature. In some embodiments, the second rail 122 may similarly have a curvature such that it contacts and is generally flush with the rotor blade segment 20. In other embodiments, as shown, the second rail 122 may overhang the rotor blade segment 20. In these embodiments, the top and/or bottom surfaces of the second rail 122 may have a curvature that generally corresponds to the curvature of the outer or inner surface 72, 70 adjacent to the second rail 122. Such curvature of the rails 120, 122 may facilitate scarfing that accounts for the curvature of the blade segment 20.

In exemplary embodiments as shown, the rails 120, 122 are generally parallel. Further, in exemplary embodiments, the rails 120, 122 are oriented along the chord-wise axis 45 of the rotor blade segment 20. In these embodiments, the rails 120, 122 may thus, for example, have curvatures that correspond to the outer or inners surface 72, 70 at spaced apart locations along the chord-wise axis 45.

As further shown, the first guide 110 may further include one or more connector rails 124. The connector rails 124 may connect the first and second curved rails 120, 122 together and maintain the orientation of the rails 120, 122 with respect to each other, as required.

As discussed, the frame 102 may further include a second guide 112. The second guide 112 may generally by movably coupled to the first guide 110. For example, in exemplary embodiments, the second guide 112 may be slidable along the first guide 110. As shown, for example, the second guide 112 may include one or more guide rails 130. Each guide rail 130 may extend between and move along the first and second curved rails 120, 122. For example, as shown, the guide rails 130 may sit on the top surfaces of the rails 120, 122 and slide along the top surfaces as shown.

In exemplary embodiments as shown, the guide rails 130 may be generally transverse to the curved rails 120, 122. For example, in some embodiments wherein the curved rails 120, 122 extend along the chord-wise axis 45, the guide rails 130 may be oriented and extend along the span-wise axis 143. In further exemplary embodiments as shown, the second guide 112, and the guide rails 130 thereof, may move along the chord-wise axis 45. This may be due, for example, to the orientation of the curved rails 120, 122 along the chord-wise axis 45.

As further shown in FIGS. 7 through 9, the second guide 112 may be movably coupled to the first guide 110 at the scarf angle 80. For example, as shown in FIG. 8, the second curved rail 122 is offset from the first curved rail 120 such that the distance between the rails and height difference between the top surfaces of the rails defines the desired scarf angle 80. The second guide 112 may be movably coupled to the first guide 110 at the scarf angle 80 by, in these embodiments for example, resting the guide rails 130 on the offset top surfaces of the curved rails 120, 122. In any event, the guide rails 130 may, through coupling of the second guide 112 to the first guide 110, extend between the first curved rail 120 and the second curved rail 122 at the scarf angle 80. Such orientation of the second guide 122 at the scarf angle 80 facilitates scarfing at the scarf angle 80.

As discussed, a tool 100 according to the present disclosure further includes a cutting device 104. As shown in FIGS. 7 through 9, the cutting device 104 may be movably coupled to the second guide 112. Such movable coupling allows the cutting device 104 to move, such as slide, along the guide rail(s) 130. The cutting device 104 may further be operable to remove material from the one of the pressure side 32 or suction side 34 on which the tool 100 is mounted. Movement of the cutting device 104 along the guide rail(s) 130 when the device 104 is operating may thus cause material to be removed at the scarf angle 80, due to the orientation of the guide rail(s) 130 at the scarf angle 80.

In exemplary embodiments, the cutting device 104 is configured for movement along the span-wise axis 43. For example, as discussed above, the guide rail(s) 130 of the second guide 112 may in some embodiments extend along the span-wise axis 43. The cutting device 104, which may be movable along the guide rail(s) 130, may thus be movable along the span-wise axis 43.

The cutting device 104 may generally be any suitable device for removing material from the one of the pressure side 32 or suction side 34 on which the tool 100 is mounted. In some embodiments, for example, the cutting device 104 may include a circular saw 140. The circular saw 140 may have a dado blade 142 or other suitable blade for removing material. In other embodiments, the tool 100 may be a router or other suitable material removal device.

To remove material from the one of the pressure side 32 or suction side 34, the cutting device 104 may be activated such that it is operable for device removal. In general, the cutting device 104 may then be moved along the guide rail(s) 130 to remove material at the scarf angle 80. After such removal, the second guide 112 may be moved along the first and second curved rails 120, 122, to reposition the cutting device 104 for further material removal. The cutting device 104 may then be again moved along the guide rail(s) 130 to remove material at the scarf angle 80. Such movement of the cutting device 104 and second guide 112 may be repeated as necessary until all required material is removed, forming a joint face 82.

The present disclosure is further directed to methods for scarfing rotor blade segments 20. A method according to the present disclosure may include, for example, moving a cutting device 104 on a frame 102 along a chord-wise axis 45 of a rotor blade segment 34. Movement along the chord-wise axis 45 may occurs generally along a curvature of the one of the pressure side 32 or the suction side 34 of the rotor blade segment 34. A method may further include, for example, moving the cutting device 104 on the frame 102 along a span-wise axis 43 of the rotor blade segment 34 at a scarf angle 80. A method according to the present disclosure may further include, for example, operating the cutting device 104 to remove material from the one of the pressure side 32 or the suction side 34.

Additionally, in some embodiments a method may include, for example, providing a rotor blade segment 20 and providing a tool 100 on one of the pressure side 32 or the suction side 34 of the rotor blade segment 34. The tool 100 may, for example, include a cutting device 104 and a frame 102, as discussed above. In some exemplary embodiments, the cutting device 104 may be movable on the frame 102 along a chord-wise axis 45 and a span-wise axis 43. Further, movement along the chord-wise axis 45 may occur generally along a curvature of the one of the pressure side 32 or the suction side 34, and/or movement along the span-wise axis 43 may occur at the scarf angle 80.

In exemplary embodiments, operating the cutting device 104 may include, for example, activating the cutting device 104, moving the active cutting device along the guide rail(s) 130 and/or span-wise axis 43 to remove material from the one of the pressure side 32 or the suction side 34, and moving the cutting device 104 along the first and second curved rails 120, 122 and/or chord-wise axis 45. Such movements may be repeated as desired to remove material, as necessary, to form a joint face 82.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tool for scarfing a rotor blade segment, the rotor blade segment comprising a pressure side, a suction side, a leading edge, and a trailing edge each extending between a first end and a second end, the tool comprising:

a first guide configured for mounting on one of the pressure side or the suction side of the rotor blade adjacent to a cutaway portion thereof, the first guide comprising a first curved rail mounted to a single first mounting component secured between the ends of the first curved rail and a second curved rail spaced from the first curved rail, the first mounting component being secured within the cutaway portion of the rotor blade, the first curved rail and the second curved rail each being rigid and having a curvature that generally corresponds to a curvature of the one of the pressure side or the suction side, the second curved rail being offset from the first curved rail such that a distance between the first and second curved rails and a difference between top surfaces of the first and second curved rails defines a scarf angle;

a second guide movably coupled to the first guide at the scarf angle of between approximately 1 degree and approximately 5 degrees, the second guide comprising a pair of parallel guide rails spaced apart along a chord-wise axis of the rotor blade segment, the pair of parallel guide rails extending between and movable along the first curved rail and the second curved rail; and a cutting device movably coupled to the second guide, the cutting device slidable between the pair of parallel guide rails during operation of the cutting device and operable during movement along the guide rail to remove material from the one of the pressure side or the suction side.

2. The tool of claim 1, wherein the first curved rail and the second curved rail are generally parallel, and wherein the guide rail is generally transverse to the first curved rail and the second curved rail.

3. The tool of claim 1, wherein the first curved rail and the second curved rail are configured for orienting along the chord-wise axis of the rotor blade segment.

4. The tool of claim 1, wherein the second guide is configured for movement along the chord-wise axis of the rotor blade segment.

5. The tool of claim 1, wherein the cutting device is configured for movement along a span-wise axis of the rotor blade segment.

6. The tool of claim 1, wherein the first guide is configured for mounting on an outer surface of the pressure side.

7. The tool of claim 1, wherein the first guide is configured for mounting on an inner surface of the suction side.

8. The tool of claim 1, wherein the rotor blade further comprises a spar cap coupled to the one of the pressure side or the suction side, and wherein the first guide is positioned such that the cutting device is operable to remove material from a portion of the one of the pressure side or the suction side that is coupled to the spar cap.

9. The tool of claim 1, wherein the cutting device comprises a dado blade.

10. The tool of claim 1, wherein the second curved rail is mounted to a second mounting component, the second mounting component being secured to one of the pressure side or the suction side.

* * * * *